United States Patent [19]

Callaghan et al.

[11] Patent Number: 4,678,621
[45] Date of Patent: Jul. 7, 1987

[54] METHOD AND MEANS FOR MONITORING THE CONTINUITY OF A FLUID-FILLED NETWORK OF CONDUITS AND VALVES

[75] Inventors: Vincent M. Callaghan, West Granby; Melvin J. Wolpert, III, Weatogue, both of Conn.

[73] Assignee: Combustion Engineering, Inc., Windsor, Conn.

[21] Appl. No.: 594,964

[22] Filed: Mar. 29, 1984

[51] Int. Cl.$^4$ ............... G21C 17/00; F16K 37/00
[52] U.S. Cl. ...................... 376/245; 137/551; 340/540; 340/679; 367/93; 376/250; 376/258
[58] Field of Search ............ 376/245, 250, 258; 340/540, 679, 686; 367/93; 137/551, 559

[56] References Cited

U.S. PATENT DOCUMENTS

| | | | |
|---|---|---|---|
| 3,914,754 | 10/1975 | Kirk | 367/93 |
| 4,029,122 | 6/1977 | Jaegtnes | 137/551 |
| 4,059,960 | 11/1977 | Osborne | 340/686 |
| 4,149,139 | 4/1979 | Kronk | 367/93 |
| 4,274,438 | 6/1981 | La Coste | 137/551 |
| 4,394,345 | 7/1983 | De Briere et al. | 376/245 |

FOREIGN PATENT DOCUMENTS

| | | | |
|---|---|---|---|
| 2947463 | 5/1981 | Fed. Rep. of Germany | 376/258 |
| 2947362 | 5/1981 | Fed. Rep. of Germany | 376/258 |

*Primary Examiner*—Salvatore Cangialosi
*Attorney, Agent, or Firm*—John H. Mulholland

[57] ABSTRACT

A fluid-filled network of connected conduits and valves receives an acoustic signal in the form of waves of predetermined frequency, amplitude, and time sequence. At a second location, an acoustic receiver senses the form of the waves in frequency, amplitude, and time sequence arriving from the transmitter. The comparison between the acoustic signal introduced into the network and the signal received from the network represents whether the valve settings are satisfactory for using the network as a unit.

6 Claims, 1 Drawing Figure

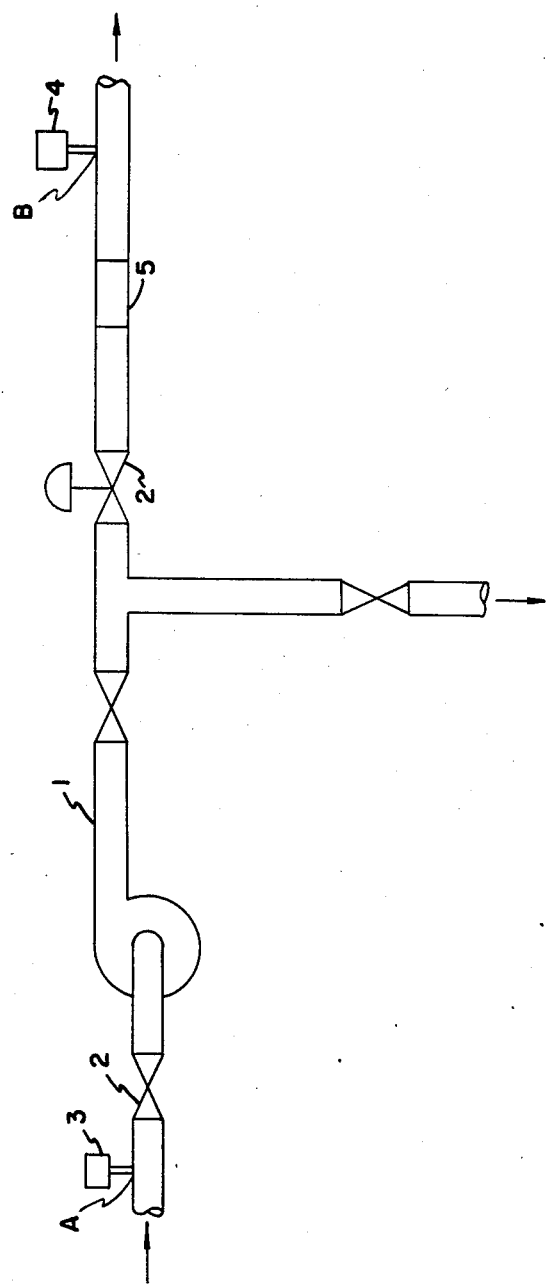

METHOD AND MEANS FOR MONITORING THE CONTINUITY OF A FLUID-FILLED NETWORK OF CONDUITS AND VALVES

TECHNICAL FIELD

The present invention relates to the introduction of acoustic signals into a conduit and valve network and their variation as received at a remote location. More particularly, the invention relates to the variation of acoustic signals in their transmission through a fluid-filled conduit and valve network as an index of the availability of the network for use.

BACKGROUND ART

The Three Mile Island incident has raised concerns about proper alignment of valves in fluid systems used to mitigate the consequences of potential incidents at nuclear powered generating plants. In other words, the nuclear generating system has certain conduit and valve networks which are on a standby basis ready to perform a safety function when there is a plant malfunction. However, the present invention is not limited to monitoring standby systems. The characteristics of the system monitored exist in systems which are operative as well as in standby status.

Monitoring valve positions in conduit networks began with actual observation of the valve stem positions. This monitoring requires actual personal visits to each valve location. Alternatively, the position of valve stems can be sensed and electrically transmitted to a centralized control station. The present invention provides an alternate to these direct systems of checking the operability or continuity of these conduit networks and their included valves. A system utilizing acoustic energy is needed as an alternate or supplement to direct observation of the valve positions.

DISCLOSURE OF THE INVENTION

The present invention contemplates the introduction of acoustic signals having a predetermined frequency, amplitude, and time sequence into the fluid of a monitored network of conduits and valves. The acoustic signal is sensed at a receiving location to determine the amplitude, frequency, and time sequence with which it arrives. The distortion or variation of the signal as it arrives indicates whether the setting of the valves connecting the conduits is acceptable.

The present invention contemplates establishing a limit on acoustic signal distortion received to determine the usefulness of the network.

Other objects, advantages and features of this invention will become apparent to one skilled in the art upon consideration of the written specification, appended claims, and attached drawing.

BRIEF DESIGNATION OF THE DRAWING

The drawing is a somewhat schematic representation of a conduit and valve network with a generator of acoustic energy and a receiver for the acoustic energy embodying the present invention.

BEST MODE FOR CARRYING OUT THE INVENTION

Terminology

When referring to a plurality of conduits including valves mounted between the conduits, the term network will apply. The network of conduits and valves will contain a fluid through which the acoustic energy is transmitted.

Acoustic energy is generated by a pressure transducer in direct contact with the fluid in the network. A source of power to pulse the pressure transducer could be an electric motor linked to the transducer to develop an acoustic signal characterized by a predetermined frequency, amplitude, and time sequence.

Distortion of the acoustic signal means the variation of the original wave form which occurs as a result of its propagation through a network of conduits and valves.

There are two stations within the network; the first station is designated "A" and is the location in the network at which the generated acoustic signal is introduced for transmission through the fluid in the network. The second station is designated "B" and is the location of the receiver which responds to the transmitted acoustic signal as distorted or varied by the fluid in the network. Also located at station B is a structure for comparing the transmitted signal with the signal received.

Embodying System

It is obvious that an acoustic signal can be transmitted through a network of conduits filled with liquid. An acoustic signal can be generated by a simple diaphragm pulsed by a motor. This generator of acoustic energy can be readily connected to the conduit/valve network at station A. The generated signal is transmitted with a frequency, amplitude, and time sequence to station B. With the conduits and valves between stations A and B, the acoustic signal which arrives at station B will have an individual thumbprint of identification. When the valves are set in a position to be predetermined as satisfactory, the received acoustic signal will have a certain characteristic frequency, amplitude, and time sequence. If there is an undesirable change such as an undesirable position of a valve or valves or a clogged filter, the distortion of the frequency, amplitude, or time sequence of the signal received can be sensed. The basic objective of the present invention is to establish the original acoustic signal at station A and sense the arrival of this signal at station B where the signal will be analyzed in its amplitude, frequency, and time sequence. If the acoustic signal arrived is distorted beyond certain standards, the valves of the network will not be in their correct position or a filter will be clogged. Corrective action can be taken in setting the valves or filter cleaned and the acoustic signals will be rehabilitated and, therefore, represent a satisfactorily corrected position of the valves in the conduits.

In the drawing, a number of conduits 1 are connected between a number of valves 2. The network of conduits and valves may be a standby auxiliary system which serves a safety function for a nuclear generating station upon the occurrence of a plant malfunction. On the other hand, the conduit and valve network may be in continual use. In either situation it is desirable to have a means for almost instantaneously determining the condition of the network in its valve settings.

The present invention is embodied in a transmitter 3 from which an acoustic signal of predetermined amplitude, frequency, and time sequence is directed into the fluid filling the conduits of the network. The mechanism for generating this acoustic signal at station A need be no more than a flexible diaphragm in contact with the fluid of the conduits. Such a diaphragm can be pulsed by a motor which is geared to the diaphragm to generate a pulsation of the fluid and thereby generate an acoustic signal into the fluid of the conduits.

At station B, some form of pressure transducer 4 is placed in physical contact with the fluid in the conduits and thereby receives the acoustic signal from station A. It is the form of the acoustic signal, in amplitude, frequency, and time sequence, which represents the conditions in the conduit and valve network. The acoustic signal received will be distorted in a predetermined manner and degree if the valves are in their correct positions. If the received signal is distorted beyond certain limits, corrective action must be taken in resetting the valves so that the network will be satisfactorily operative.

Summation

This disclosure assumes the availability of a transmitter which can generate an acoustic signal with at least the three characteristics which have been referred to repeatedly. Also, the disclosure assumes the availability of a receiver which can determine at least the three characteristics of the acoustic signal received from the transmitter. Further, the assumption is that the receiver can continuously compare the received signal, in its characteristics, with the acoustic signal generated by the transmitter, in its characteristics. From this comparison, the deviation of the characteristics of the signal transmitted can be calibrated to determine whether valve positions are compatible with the intended function of the network of conduits and valves.

This method which utilizes the functions of available acoustic transmitters and receivers finds its analogy in striking a chord on a piano. Three notes (frequency, amplitude, and time sequence) produce a resonance at the receiver which can be analyzed for change undergone in its trip through the network of valves and conduits. This "chord" in its change detected at the receiver can be read in its variation undergone in its travel from the transmitter to the receiver to identify the anomaly of undesirable valve positions. Structural novelty is to be found in the combination of the transmitter connected to the monitored network of valves and conduits, and the receiver of the acoustic signal which can be calibrated to reveal unsatisfactory conditions such as valve position. Finally, the invention can be expressed as a method of utilizing well-known acoustic transmitters with which to generate and send the acoustic signals, and a receiver which processes the acoustic signals after they have made their trip through the valves and conduits. From both viewpoints the invention is novel.

An editorial review of the foregoing written disclosure determines that the network which has been referred to as containing only valves 2 incorporated within the network. As a matter of delinquent fact, equipment other than valves may characterize the acoustic signal sound from position A to position B. For example, a filter or strainer may become clogged to some degree and distort the acoustic signal as would a partially open valve 2. The teaching of what structures may be included in the conduit network is not limited to valves. Equipment devices such as filters or strainers may distort the form of the acoustic signal by effectively reducing the cross-sectional area of the conduits. Therefore, the signal distortion is expected to locate more than valve malfunction or undesirable change.

From the foregoing, it will be seen that this invention is one well adapted to attain all the ends and objects hereinabove set forth, together with other advantages which are obvious and inherent to the method and apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

We claim:

1. A system for monitoring the continuity of a network of fluid-filled conduits and valves, including,
   a network of conduits and valves which function as a unit to perform a task in a larger system,
   a first pressure transducer connected to the network at a predetermined location to emit an acoustic signal of predetermined amplitude and frequency and time sequence and transmit said signal into and through the fluid of the network,
   a second pressure transducer connected to the network at a predetermined location remote from the first pressure transducer which receives said signal from said fluid and responds to the acoustic signal from the first pressure transducer,
   means for comparing the amplitude and frequency and time sequence of the acoustic signal received at the second pressure transducer with the signal transmitted by the first pressure transducer and thereby determine any variation in the amplitude and frequency and time sequence in the transmitted acoustic signal as a guide to locating a change in the network which causes the variation in the signal received.

2. The system of claim 1, wherein,
   the change determined is an incorrect valve position in the network.

3. A method for monitoring a network including at least fluid-filled conduits and valves to locate any change in the network, including,
   introducting an acoustic signal of predetermined amplitude and frequency and time sequence into the fluid of the conduits at a predetermined location in the network,
   passing the signal from the point of introduction through the network to a second location,
   detecting the acoustic signal from the network at the second location as varied from the signal introduced at the first location,
   and comparing the signal as introduced to the signal received as a guide to locate a change in the network.

4. The method of claim 3, in which,
   the change detected is an incorrect valve setting in the network.

5. The method of claim 3, in which,
   the change detected is a partially clogged filter in the network.

6. The method of claim 3 in which the network is in a nuclear power generating system.

* * * * *